Nov. 12, 1968   J. W. DAIBER ET AL   3,410,142
LASER-DRIVEN SHOCK TUBE
Filed July 27, 1966

INVENTORS
JOHN W. DAIBER.
BY ABRAHAM HERTZBERG.
CHARLES E. WITTLIFF.
AGENT.

3,410,142
LASER-DRIVEN SHOCK TUBE
John W. Daiber, Williamsville, Abraham Hertzberg, Tonawanda, and Charles E. Wittliff, Williamsville, N.Y., assignors to Cornell Aeronautical Laboratory, Inc., Buffalo, N.Y., a corporation of New York
Filed July 27, 1966, Ser. No. 568,288
3 Claims. (Cl. 73—432)

ABSTRACT OF THE DISCLOSURE

A shock tube having a compression chamber and an expansion chamber separated by a frangible diaphragm, wherein a plurality of lasers surround the compression chamber for imparting energy to a driver gas therewithin.

Figure 1:
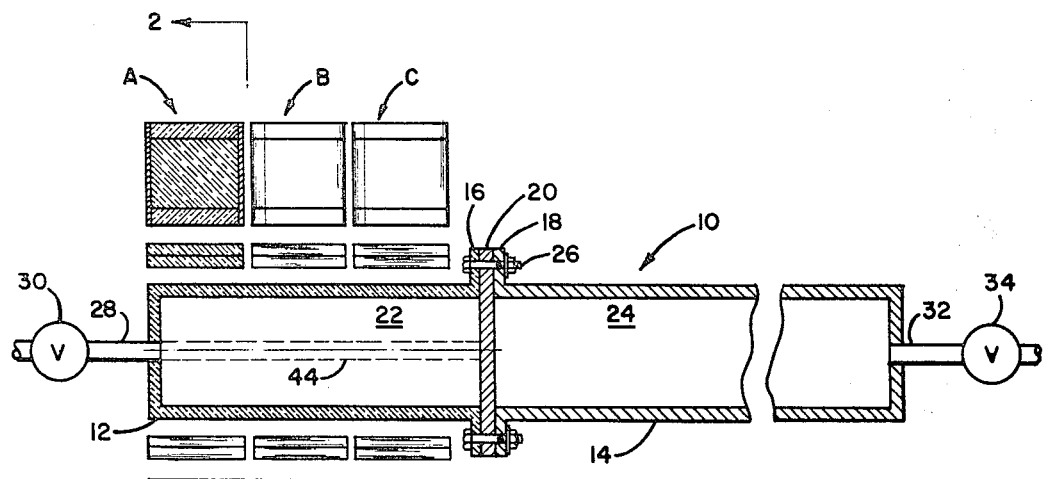

The present invention relates to shock tubes.

Shock tubes are widely used to study gas behavior at high temperatures and pressures. High-speed shock waves must be generated to produce the necessary temperatures and pressures of interest in a test gas. This is generally accomplished by separating a tube into a compression and expansion chamber by means of a frangible diaphragm or the like. Driver gas such as hydrogen or helium in the compression chamber has its pressure increased over that of the test or driven gas in the expansion chamber. Rupture of the diaphragm separating the two chambers causes a rapid expansion of the driver gas thereby generating shock waves that function to increase the pressure and temperature of the test or driven gas. The velocity of the shock wave, and therefore the maximum pressures and temperatures obtainable in the driven gas, is a function of the pressure ratio across the diaphragm and speed of sound ratio of the driver-to-driven gas. At any given driver gas temperature, the shock wave Mach number will increase with increasing pressure ratios, but approaches a limiting value whereat further increases in pressure ratio cannot produce higher shock wave velocities. In order to produce higher shock wave Mach numbers, the speed of sound of the driver gas must be increased by raising the temperature of the driver gas.

Up to the present time, to achieve the highest possible shock Mach numbers, it had been thought that energy addition to the driver gas must take place substantially at the limiting pressure ratios mentioned supra, and to contain the gases at these very high pressure ratios would require costly high-strength facilities.

Applicants have discovered that for any given energy addition, maximum shock Mach numbers will occur at certain optimum pressure ratios that are lower than the limiting pressure ratios. This means that lower pressure ratios than anticipated will produce higher shock wave Mach numbers, thereby permitting the use of smaller, lower-strength facilities.

At present the highest Mach numbers are produced in electric-arc discharge shock tubes, which use the electric energy generated by an arc to heat the driver gas to high temperatures. With this method, evaporated material from the electrodes in the driver tube cause contamination of the shock tube, necessitaating the careful cleaning thereof after each test to avoid contamination of the test gas on subsequent runs.

The present invention relates to a novel method of imparting energy to the driver gas whereby much higher Mach numbers are achievable with lower-strength facilities and without the problem of contamination.

Basically, the principles of the present invention are realized by coupling the energy generated by a plurality of laser devices to the driver gas in the compression chamber of a shock tube. Thus, high energy beams of coherent radiation are fired at the driver gas in the compression chamber whereby the temperature and pressure of the driver gas are increased substantially.

Figure 2:
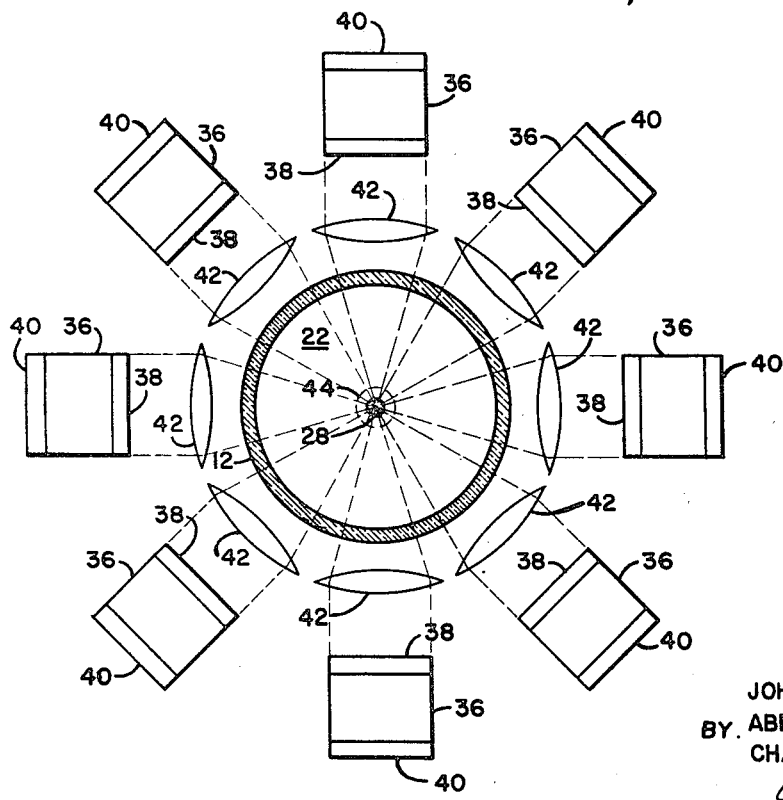

For a fuller understanding of the present invention, reference may be had to the following detailed description of the same taken in conjunction with the accompanying drawings wherein:

FIGURE 1 is an elevational view in section of the shock tube of the present invention with parts thereof shown schematically, and, FIGURE 2 is a section taken along line 2—2 of FIGURE 1.

Referring now to the drawings, there is shown in FIGURE 1 an elongated tubular shock tube indicated generally by reference numeral 10 comprising a first cylindrical wall member 12 and a second cylindrical wall member 14, each having respective flange means 16 and 18. As shown, members 12 and 14 are suitably bolted together by bolts 26.

Whereas member 14 may be of conventional metallic construction, member 12 is fabricated of a suitable transparent material as glass or plastic for a purpose to become apparent hereinbelow. A frangible diaphragm 20 is located intermediate flanges 16 and 18 separating the interior of members 12 and 14 into a compression chamber 22 and an expansion chamber 24.

A source of compressed driver gas as helium or hydrogen communicates with compression chamber 22 by means of line 28 and valve 30. The air or other test gas in expansion chamber 24 communicates with a source of vacuum via line 32 and valve 34.

A plurality of groups of laser devices A, B, and C severally extend substantially the entire length of compression chamber 22. As shown in FIGURE 2 each group of laser devices contains a plurality of lasers 36 circumferentially arrayed about the periphery of the compression chamber. The lasers may be conventional ruby lasers with partially reflective ends 38 and fully reflective ends 40. The lasers are adapted to be fired simultaneously and may have a common power source. Associated with each laser is a cylindrically convex lens 42 which focuses the laser beam at the central longitudinal axis of compression chamber 22. The total number of lasers chosen are such that upon energization thereof, the total central area 44 of compression chamber 22 is filled with the laser light.

In operation, the air in chamber 24 is rarefied while the high-pressure driver gas is admitted to chamber 22 to thereby establish an initial pressure differential across diaphragm 20.

As pointed out earlier, this pressure differential or ratio need not be as high as originally anticipated. Thus, the diaphragm 20 and member 12 need not be of very high strength. The lasers are then fired simultaneously and the energy in the beams thereof passing through the transparent walls of member 12 is absorbed very rapidly by the central volume of driver gas at 44. This causes the temperature and pressure of the driver gas to rise very rapidly to a value greatly in excess of the initial value. Although the final pressure of the driver gas is many times greater than that required to rupture the diaphragm, the energy absorption occurs so rapidly (on the order of nanoseconds) that the diaphragm does not have time to rupture until the absorption is completed. When the diaphragm does rupture, the high-temperature, high-pressure driver gas expands rapidly into the low pressure region creating high-velocity shock waves in the usual manner.

For any given size shock tube, the actual value of the shock wave Mach numbers depends upon the energy of the lasers. For example, with laser energies of 10 joules, Mach numbers of about 42 are obtainable; whereas, with laser energies of 100 joules, it is possible to achieve Mach numbers of about 200.

It will be appreciated that since no foreign substances are in contact with the driver gas, the process is completely free of any contamination.

While a preferred manner of carrying out the principles of the present invention has been illustrated and described, modification will occur to those skilled in the art. Therefore, the invention should be limited only by the scope of the appended claims.

What is claimed is:
1. In a shock tube, the combination comprising;
 (a) means providing a compression chamber,
 (b) means providing an expansion chamber,
 (c) frangible means separating said chambers, and,
 (d) means surrounding said compression chamber for firing high-energy beams of coherent radiation thereinto.
2. The shock tube according to claim 1 wherein;
 (e) said compression chamber means is fabricated of a transparent material.
3. The shock tube according to claim 2 wherein said compression chamber is elongated and said means surrounding said compression chamber comprises;
 (f) a plurality of laser devices circumferentially arrayed about the periphery of said of said compression chamber and extending substantially the entire length thereof, and,
 (g) a plurality of lenses associated with each laser device for directing the beams of radiation therefrom toward the central, longitudinal axis of said compression chamber.

References Cited
UNITED STATES PATENTS

| | | | |
|---|---|---|---|
| 2,966,793 | 1/1961 | Mullaney et al. | 73—35 |
| 3,182,496 | 5/1965 | Holderer | 73—147 |
| 3,285,063 | 11/1966 | Ferri | 73—147 |

RICHARD C. QUEISSER, *Primary Examiner.*
VICTOR J. TOTH, *Assistant Examiner.*